(12) United States Patent
Schalk et al.

(10) Patent No.: US 11,021,351 B2
(45) Date of Patent: Jun. 1, 2021

(54) LIFTING DEVICE FOR PALLET GOODS

(71) Applicant: Sprick GmbH Bielefelder Papier- und Wellpappenwerke & Co., Bielefeld (DE)

(72) Inventors: Bastian Schalk, Lage (DE); Christoph Engemann, Warburg (DE)

(73) Assignee: Sprick GmbH Bielefelder Papier- und Wellpappenwerke & Co., Bielefeld (DE)

(*) Notice: Subject to any disclaimer, the term of this patent is extended or adjusted under 35 U.S.C. 154(b) by 24 days.

(21) Appl. No.: 15/525,008

(22) PCT Filed: Oct. 27, 2015

(86) PCT No.: PCT/EP2015/002131
§ 371 (c)(1),
(2) Date: May 5, 2017

(87) PCT Pub. No.: WO2016/070969
PCT Pub. Date: May 12, 2016

(65) Prior Publication Data
US 2017/0313562 A1 Nov. 2, 2017

(30) Foreign Application Priority Data
Nov. 6, 2014 (DE) ...................... 10 2014 016 371.7

(51) Int. Cl.
*B66F 9/065* (2006.01)
*B66F 9/18* (2006.01)
(Continued)

(52) U.S. Cl.
CPC ............ *B66F 9/065* (2013.01); *B62B 3/0612* (2013.01); *B62B 3/0643* (2013.01); *B66F 9/12* (2013.01);
(Continued)

(58) Field of Classification Search
CPC .. B66F 9/065; B66F 9/183; B66F 9/12; B62B 3/0612; B62B 3/0643; B62B 2203/24;
(Continued)

(56) References Cited

U.S. PATENT DOCUMENTS 2,412,184 A * 12/1946 Ulinski .............. B65D 19/0038
108/52.1
2,451,226 A * 10/1948 Kemp, Jr. .......... B65D 19/0034
414/349
(Continued)

FOREIGN PATENT DOCUMENTS

NL 1016255 C2 3/2002
WO WO_0018651 * 4/2000
(Continued)

OTHER PUBLICATIONS

Vestil (Vestil All-Terrain Pallet Jack—2000-Lb. Capacity, Model# ALL-T-2) found at:https://www.youtube.com/watch?v=r034f2amHQk (Year: 2012).*
(Continued)

*Primary Examiner* — Lee D Wilson
*Assistant Examiner* — Mahdi H Nejad
(74) *Attorney, Agent, or Firm* — Schiff Hardin LLP (57) ABSTRACT

Lifting device for pallet goods for loading and unloading of a transport pallet such as a standard pallet, for example a euro pallet. The lifting device comprises a support frame, a tine assembly liftable mounted to the support frame of at least two, preferably four, tines having a parallel direction of extension for lifting and receiving the transport goods from the transport pallet and/or for depositing the transport goods onto the transport pallet. A tine spacing of two tines is adapted to a gap spacing of two longitudinal gaps and at least two tines are form-fitted with regard to the at least two
(Continued)

longitudinal gaps such that they can access the longitudinal gaps in the longitudinal direction.

22 Claims, 6 Drawing Sheets (51) Int. Cl.
    *B62B 3/06*     (2006.01)
    *B66F 9/12*     (2006.01)

(52) U.S. Cl.
    CPC .......... *B66F 9/183* (2013.01); *B62B 2203/10* (2013.01); *B62B 2203/22* (2013.01); *B62B 2203/24* (2013.01)

(58) Field of Classification Search
    CPC ............ B62B 2203/22; B62B 2203/10; B65D 2519/00805; B65D 19/00333; B65D 2519/00318; B65D 2519/00288
    USPC ..................................... 108/52.1, 51.11, 51.3
    See application file for complete search history.

(56) References Cited

U.S. PATENT DOCUMENTS

| | | | | |
|---|---|---|---|---|
| 2,509,682 | A * | 5/1950 | Golrick | B66F 9/12 108/52.1 |
| 2,625,355 | A * | 1/1953 | Adams | B65D 19/0095 108/52.1 |
| 2,890,849 | A * | 6/1959 | Fogarty | B65D 19/0026 108/57.15 |
| 3,151,754 | A * | 10/1964 | Kemp, Jr. | B65G 1/00 414/416.04 |
| 3,312,361 | A * | 4/1967 | Foster | B66F 9/065 414/724 |
| 3,380,404 | A * | 4/1968 | Shell | B65D 19/0081 108/52.1 |
| 3,381,834 | A * | 5/1968 | Gibson | B66F 9/122 414/607 |
| 3,387,731 | A * | 6/1968 | Gibson | B66F 9/16 414/639 |
| 3,499,658 | A * | 3/1970 | White | B62B 1/14 280/47.2 |
| 4,059,057 | A * | 11/1977 | Carnwath | B65D 19/0095 108/52.1 |
| 4,145,975 | A * | 3/1979 | Colbert | B65D 19/0044 108/52.1 |
| 4,267,780 | A * | 5/1981 | Candella | B65D 19/0016 108/52.1 |
| 4,355,947 | A * | 10/1982 | Wiblin | B66F 9/12 403/408.1 |
| 4,819,816 | A * | 4/1989 | Noble, Sr. | B65D 19/0016 211/189 |
| 4,972,782 | A * | 11/1990 | Shepherd | B65D 19/0059 108/52.1 |
| 5,174,415 | A * | 12/1992 | Neagle | B66F 9/06 180/209 |
| 5,209,629 | A * | 5/1993 | Rasmussen | B65H 15/02 414/728 |
| 5,415,516 | A * | 5/1995 | Richards | B60P 1/025 187/234 |
| 5,538,387 | A * | 7/1996 | Durivage | B65D 19/0002 108/52.1 |
| 5,727,924 | A * | 3/1998 | Hummel | B65D 19/38 271/158 |
| 6,112,672 | A * | 9/2000 | Heil | B65D 19/0026 108/54.1 |
| 6,490,982 | B1 * | 12/2002 | Trickett | B65D 19/0081 108/51.11 |
| 6,622,854 | B2 * | 9/2003 | Coblentz | B63B 25/22 414/803 |
| 7,524,159 | B2 * | 4/2009 | Mammone | B65F 1/1468 414/812 |
| 7,837,246 | B2 * | 11/2010 | Gustavsson | B66C 1/663 294/81.1 |
| 9,975,727 | B1 * | 5/2018 | Jordan | B65H 49/325 |
| 10,604,168 | B2 * | 3/2020 | Torrison | B62B 1/06 |
| 2006/0182620 | A1 * | 8/2006 | Guidroz | B65D 71/0088 414/814 |
| 2006/0288914 | A1 * | 12/2006 | Lee | B65D 19/0038 108/51.11 |
| 2007/0237612 | A1 * | 10/2007 | Mammome | B65F 1/1468 414/420 |
| 2008/0012259 | A1 * | 1/2008 | Desbiens | B62B 3/0643 280/79.11 |
| 2009/0229498 | A1 * | 9/2009 | Hamby | B65D 19/40 108/57.33 |
| 2014/0208988 | A1 * | 7/2014 | Hsu | B65D 19/0093 108/52.1 |
| 2016/0198633 | A1 * | 7/2016 | Machado | A01D 87/127 414/24.5 |
| 2017/0355575 | A1 * | 12/2017 | Ni | B62B 3/0637 |
| 2017/0369292 | A1 * | 12/2017 | Ni | B66F 9/065 |

FOREIGN PATENT DOCUMENTS

WO     2010/091689 A1     8/2010
WO     2014/110383 A1     7/2014

OTHER PUBLICATIONS

International Search Report dated Nov. 6, 2014.

* cited by examiner

LIFTING DEVICE FOR PALLET GOODS

BACKGROUND

The invention relates to a lifting device for pallet goods for loading and unloading of a standard pallet, such as a euro pallet or euro pool pallet. Such standard pallets are certified for example in Europe under the registered trademark EPAL, European pallet Association e. V. There are also types of standard pallets, such as industry pallets or Asia pallets, which have their own dimension specifications, which shall form part of the disclosure of the present application documents.

In particular, the invention relates to a lifting device for loading and unloading of a standard pallet with a paper stack stock which is used to form packaging or dunnage material. These paper stack stocks are often stocked in cube-formed paper web stocks folded according to a leporello. With such paper web stocks dunnage or packaging machines are fed, which are for example shown in WO 2014/110383 A1.

According to the invention, a lifting device for transport goods with regard to a standard pallet shall be provided which allows for a secure and damage-free lifting of the transport goods from the pallet. Also, it shall be possible to deposit the transport goods from a storage position onto the standard pallet and to allow for further transporting to a packing location.

There are several possibilities to lift transport pallets, for example with a lift truck or a fork lift having accessing tines which are configured to engage access clearances arranged on the lower side of the pallet in the support structure of the standard pallet. However, it is very difficult with these fork lifts to separate the transport goods from the standard pallet.

Lifting devices for pallet goods are known in the area of supplying construction material, as WO 2010/091689 A1 shows. Accordingly, gripping devices are described which demand for an access from the upper side of the standard pallet to insensitive transport goods. These lifting devices for pallet goods are not suitable for lifting sensible transport goods, such as a paper stack stock, preferably without damage from the standard pallet.

It is an object of the invention to overcome the disadvantages of the state of the art, particularly to provide a lifting device for pallet goods which allows for a lifting and depositing of sensible pallet goods, such as a paper stack stock, preferably without damage.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings.

DETAILED DESCRIPTION

In the following description, numerous specific details are set forth in order to provide a thorough understanding of the embodiments of the present disclosure.

Accordingly, a lifting device for loading and unloading of pallet goods onto and from a pallet, such as a standard pallet, for example a euro pallet, is provided. The standard pallet comprises a support structure, usually made of wood, particularly made from strutted wooden blocks, wherein the support structure usually comprises lateral access clearances below the rest of the pallet, in which tines of a fork lift can access in order to lift the standard pallet including the transport goods. Further, the standard pallet comprises a rest or seat forming the upper side of the pallet, on which the corresponding transport or pallet goods is to be deposited and which comprises a plurality of longitudinal panels, such as boards, spaced apart from each other by forming at least two, preferably four, longitudinal gaps arranged parallel to each other. The longitudinal gaps are open to the upper side of the pallet and have a minimum height starting from a longitudinal or cross bar of the thickness of the longitudinal panels. The lifting device for pallet goods according to the invention comprises a support frame and a tine assembly liftably mounted on the support frame of at least two, preferably four tines, extending parallel to each other for lifting and receiving the transport goods from the transport pallet and/or for depositing the transport goods onto the standard pallet. It shall be clear that the number of the tines preferably can be equal to the number of the longitudinal gaps of the rest. In order to lift the tine assembly an elevation drive is provided which can be activated manually, electrically, pneumatically or hydraulically. Preferably, a manual elevation drive is preferred which is mounted on the support frame and can be actuated with the foot of an operator. According to the invention, a parallel tine spacing of two tines is adapted to a longitudinal gap spacing of two longitudinal gaps and the at least two tines are form-fitted with regard to the at least two longitudinal gaps such that they can access or enter the longitudinal gaps in a longitudinal direction, wherein particularly the inserted tine section does not protrude the upper side of the pallet. It was found that the longitudinal gaps commonly provided between the boards forming the rest of the standard pallet are sufficiently large so that correspondingly dimensioned tines for example made of metal or plastic are stiff enough to access the longitudinal gaps and to lift the transport goods without a damage from the standard pallet and to deposit it onto the standard pallet. It shall be clear that the tines are dimensioned such that they can either access in the longitudinal direction horizontally into the longitudinal gap when transport goods, such as a paper stack stock, is located on the rest of the standard pallet. For depositing the transport goods onto the rest of the standard pallet, the tines can occupy the longitudinal gaps being open to the upper side in a vertical direction, wherein once the tines are vertically lowered, the transport goods are deposited on the rest.

Commonly, four longitudinal gaps are provided in a standard pallet such that a lifting device for pallet goods according to the invention comprises four or three, or two tine shapes adapted to a corresponding shape of the longitudinal gap.

In a preferred embodiment of the invention, a free end section of the at least two tines is dimensioned smaller than the dimension of the longitudinal gaps. It shall be clear that the height of a tine at the end section can increase along the adjacent middle section of the tine until a tine base of the tine assembly connecting the tines such that the tine section can at least partially protrude the upper side of the pallet as long as the major part of the transport goods is deposited on the rest of the pallet upon lowering the tines into the longitudinal gaps such that upon the following exiting or pulling out of the tines in a horizontal direction, the static friction of the transport goods on the rest of the pallet is bigger than on the protruding tine section, on which the transport good is still lying. It is preferably ensured that upon accessing for receiving the transport goods on the tines, the free end of the tines firstly remains contactless with regard to the transport goods lying on the upper side of the pallet until throughout the tine section, the tine height reaches the upper side of the pallet whereby the transport goods can be gradually lifted upon further accessing.

Preferably, the at least two tines of the tine assembly are dimensioned along the major part of its longitudinal extension such that they can access or can be lowered into the longitudinal gaps wherein the height of the tines does not protrude the upper side of the pallet.

In a further development of the invention, the dimension of the at least two tines is defined by a height dimension and a width dimension, which dimensions are preferably constant throughout its longitudinal extension. At the tip of the tine, a tapering can be provided to facilitate accessing upon unloading the transport pallet.

The height dimension of the at least two tines particularly at their transport goods carrying section which forms the major part of the section of the tines at which the transport goods are finally received, is preferably at most 25 mm or at most 22 mm. If a longitudinal gap of the transport pallet has a height of less than 20 mm but more than 15 mm a corresponding height dimension should be between 15 mm and 20 mm.

The width dimension of the tines particularly at the transport goods carrying section shall be at most 40 mm or at most 30 mm depending on the width of the longitudinal gaps of the pallets. Preferably, the width dimension and the height dimension are predetermined and do not change throughout the longitudinal extension of the tines essentially.

In order to adapt the lifting device for pallet goods according to the invention to various pallet configurations or structures, the tines or the whole tine assembly can be replaced with regard to the lifting device such that those tines can be mounted to the lifting device according to the invention which are suitable for the application with a specific transport pallet for an application according to the invention.

In a preferred embodiment of the invention, the tine assembly has exactly four tines which are to be arranged in a transverse direction with respect to each other according to the longitudinal gap spacing. The two outer tines are spaced from each other preferably at a transverse middle spacing of 100 mm to 120 mm, wherein the longitudinal middle axis spacing of the tines is a degree for the transverse middle spacing. The transverse middle spacing in a transverse direction between the middle tines is preferably 140 mm to 160 mm.

In a further development of the invention, the at least two tines are movable in a height direction at a particularly mobile frame, such as a chassis, by an elevation device which is mounted on a frame and configured to lift the transport goods at most 10 mm to 100 mm from a lower initial position. The elevation device can comprise a transmission, such as a step gear, which is operable by an operator by foot. Further, the elevation device has a lowering device which upon actuation can lower the tine assembly particularly in a damped manner under the influence of the weight of the tine assembly and if applicable the weight of the transport goods into a transferring transport goods position. The lowering device is configured to completely lower the tine assembly into the initial position upon actuation even in case of several increasing steps.

In a preferred embodiment of the invention, the elevation device comprises a vertically limited elevation amplitude, which lifted elevation position is distant from a lower initial position of at most 20 cm, particularly 15 or 10 cm. The lower starting position of the elevation device is realized by a stop against which the tine assembly or a corresponding component of the elevation device abuts so that a further downwards movement of the tine assembly in a vertical direction is limited. The upper lifting position is determined in that the tine assembly or a component of the elevation device cooperates with a locking device, such as an engagement device, in order to prevent a further movement of the tine assembly by the elevation device in a vertical direction and particularly to maintain the tine assembly including the pallet goods in the lifting position. In the lifting position, the pallet goods can be moved from the pallet or to the pallet. In a further development of the invention, the elevation device is formed by a rocker structure which comprises a load lever at a side of the tine assembly and an actuation level at an actuation side. The respective lever lengths are measured by the corresponding distance to a pivot bearing axis fixed to the frame of the rocker structure to a force carrying position respectively a force deviation position. In order to facilitate the lifting of heavy loads via the elevation device, the actuation lever length is bigger, particularly at least twice, three times or four times as big as the load lever length. Preferably, the actuation lever and the load lever are formed from one piece.

In order to transfer the pivoting movement of the force transferring position at the load lever in a vertical elevation movement, the tine assembly is coupled to the load lever via a multi hinge joint support. In order to ensure that an operator actuates the elevation device at a predetermined, position defined force introduction point of the actuation lever, a foot pedal can be arranged particularly at an end of the actuation lever.

The lower initial position of the tine assembly is preferably adjusted such that the tine assembly is at a vertical height substantially corresponding to the vertical height of the longitudinal gaps of the transport pallet. The lifting position is determined in that the tine assembly is positioned slightly, preferably more than 1 cm, vertically above the upper supporting surface of the transport pallet.

For locking the tine assembly in a lifting position preferably a detent, particularly biased via a spring, is provided which is biased in its engaging condition. The tine assembly can move the detent preferably along a sloping approach surface against the biasing out of the engagement condition. The tine assembly or a component of the elevation device, such as the actuation lever or the foot pedal, is provided with a snapping clearance such that upon reaching the lifting position, the spring bias causes a detent to snap into the snapping clearance. Via a releasing device, the detent can be moved against the bias from the engaging condition into a releasing condition. Upon actuation of the releasing device, the tine assembly reaches into the lower initial position under the influence of weight.

Preferably, the lowest lowering position of the tine assembly is lower than the corresponding height of the transport pallet. Preferably, the minimal height (calculated from the rolling plane of the chassis or placing plane of the frame) for lowering the tine assembly of at least 10 mm smaller than the height of the rest of the transport pallet which is for example 90 mm to 100 mm. The lowering motion of the tine assembly stops as soon as the tine assembly abuts a cross bar of the pallet at which the panel rest or board rest of the pallet frame structure is attached to. The lifting motion of the tine assembly can also be limited by abutting a stop fixedly attached to the frame.

In a further development of the invention, a chassis of the lifting device for pallet goods according to the invention comprises a U-shape or an H-shape in a top view, wherein the laterally extending legs extending parallel to the tines of the tine assembly, which support the wheels of the chassis, are rigidly connected to each other via a cross bar of the chassis in order to form a stiff or form stable chassis. The cross bar also serves to receive the elevation device including the transmission for which reason the cross bar is hollow. In this way a housing-like protection for the mechanics of the elevation device is provided.

In a preferred embodiment of the invention, the chassis has at least two preferably lockable wheels, wherein an arrangement of three or four wheels is preferred. The at least two wheels are spaced apart from each other at a distance perpendicular to the longitudinal direction particularly at the legs of the chassis such that they role parallel past the longitudinal sides of the transport pallet. The wheel and the cross bar form a bridge/pillar construction over the lateral extension of the transport pallet. At least one of the wheels is provided at the laterally extending leg of the frame formed above.

In a preferred embodiment of the invention, the chassis has at least two preferably lockable wheels, particularly a front pair of wheels and a rear pair of wheels according to a longitudinal direction. A front wheel and a rear wheel are each provided at one of the legs of the chassis. A distance in a transverse direction of each of the corresponding wheels is at least 800 mm and particularly at most 1200 mm or 1500 mm.

The chassis forms in a top view a frame structure being open in a direction of the extension of the tines, which frame structure is formed by cross bars and the legs extending essentially parallel to the tines. In a top view, the chassis has a U- or an H- or a V-shape. In this way the chassis forms an access opening in which the pallet can access, which means that the legs can pass by the pallet. The free opening width of the access opening is bigger than the dimensions of the pallet in the lateral or the longitudinal direction.

In a preferred embodiment of the invention, lateral supports for the transport goods are attached to the particularly mobile frame. The supports are configured as a frame which particularly is positioned such that a lower longitudinal bar of the frame is at a height to which the tines are maximally liftable. The paper web stack to be lifted can for example glide at the frame providing a vertical guiding for the transport goods.

In a preferred embodiment of the invention, the tine assembly comprises a support base particularly being perpendicular with regard to the extension to the tines, the support base being movably mounted on a frame of the lifting device for pallet goods. Particularly, the support base can be adjusted laterally in a transverse direction relative to the frame or to the chassis to allow for an adaption to the configuration of the longitudinal gaps of the transport pallets. The support base is preferably mounted on the frame of the lifting device for pallet goods via a shifting and locking device which also allows to completely replace the tine assembly.

In a preferred embodiment of the invention, the tines are movably and fixedly provided at the frame, particularly along the support base of the tine assembly in a transverse direction Q in order to be adaptable to a different longitudinal gap spacing. The support base can preferably comprise predetermined position detents for the tines which location corresponds to the position of the longitudinal gaps of different standard pallets. In this way the lifting device for pallet goods according to the invention is adaptable to any assembly of modern or future transport pallets, as long as they comprise longitudinal gaps in which the corresponding form-fitted tines can access, leave and/or into which they can be lowered.

In a preferred embodiment of the invention, the tines are attached to a lower side of the particularly rod-shaped carrier base so that the support base is positioned above the rest of the standard pallet when the tines have accessed the longitudinal gaps of the standard pallet. The support base can be mounted in a cavity of the cross bar of the frame linear movably in the height direction to be operable by the elevation device.

Further, the invention relates to a modular system with a lifting device for pallet goods according to the invention. Further, the modular system has a set of tine assemblies and/or tines from which the corresponding tine respectively the corresponding tine assembly can be chosen and which can cooperate with the respective transport pallet according to the invention. Therefore, the tine assembly or the at least two tines are replaceable attached to the lifting device to be mounted and disassembled according to an application.

In FIGS. 1 to 10, the lifting device for pallet goods according to the invention is generally indicated by the reference numeral 1. The lifting device 1 is standing in front of a standard pallet 3, namely a euro pallet, which has a dimension of 800×1200 mm. The standard pallet has six columns 5, which are attached together by longitudinal bottom boards 7 at a bottom side and transverse intermediate boards 11 forming the support structure of the standard pallet 3. The support structure 13 forms lateral access clearances 15 in a transverse direction Q and a longitudinal direction L, in which tines of a forklift (not shown) can access.

The rest or seat 17 of the standard pallet 3 is formed by five carrying panels or boards 21 extending in the longitudinal direction L and defining a longitudinal gap 23 extending in the longitudinal direction L adjacent to each other wherein the longitudinal gap is open to the upper side of the pallet. The longitudinal gaps 23 extend in the longitudinal direction L from the shorter transverse side (800 mm) to the opposing side. It shall be clear that for the purpose of the lifting device for pallet goods according to the invention it is not important that the longitudinal extension of the longitudinal gaps 23 is continuous. Rather, merely a longitudinal gap at the longitudinal side or the transverse side of the standard pallet 3 in the area of the rest 17 is required. The longitudinal extension of the longitudinal gaps should be dimensioned such that the tines 51 which are described later can access into the longitudinal gaps 23 of the lifting device for pallet goods as far as necessary.

On the standard pallet 3 two cube-shaped, zig-zag or leporello-folded paper web stacks 25, 27 are already arranged which dimension in the transverse and depth direction is adapted to the standard pallet.

Figure 2:
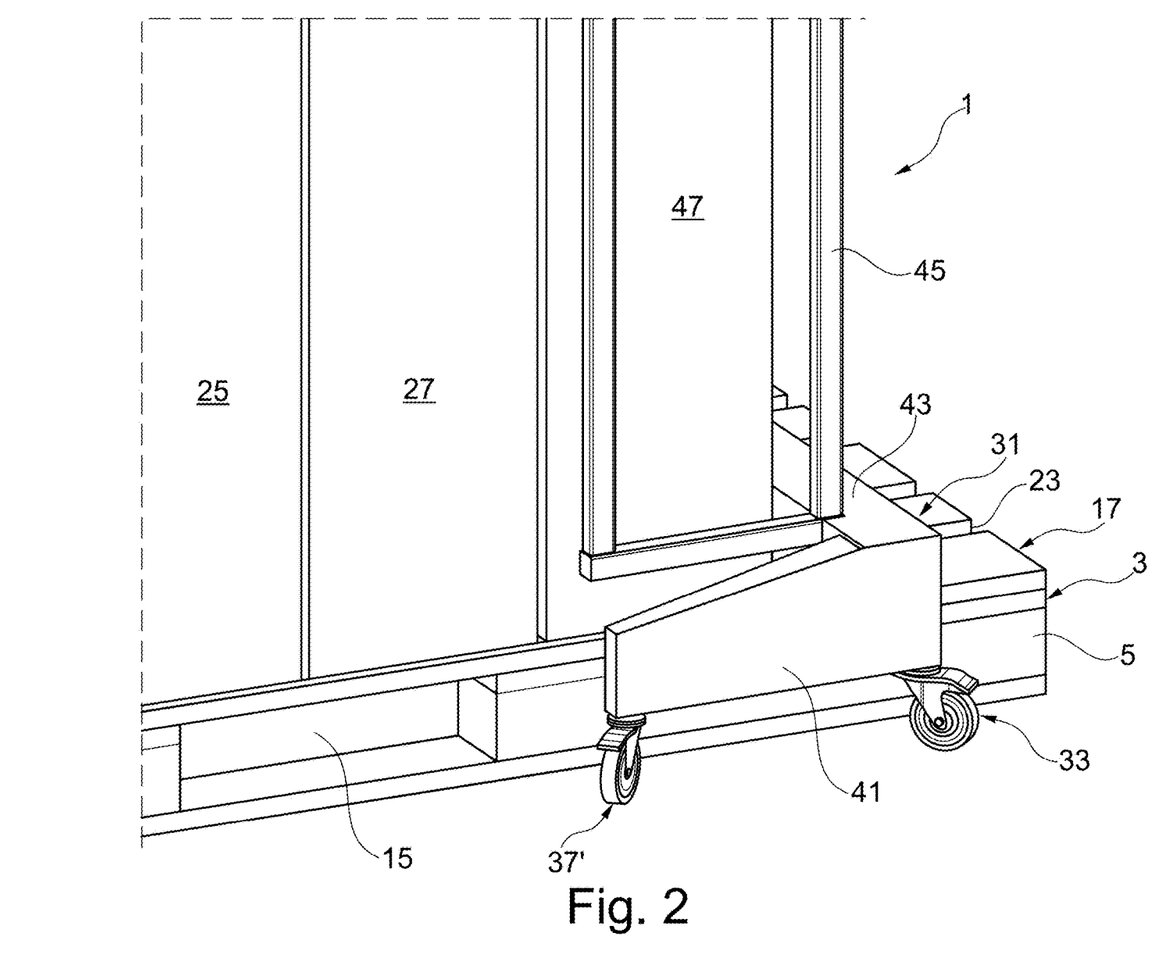
FIG. 2 shows a perspective detailed view according to FIG. 1, where the lifting device for pallet goods has accessed the standard pallet in order to deposit the pallet goods.
Figure 3:
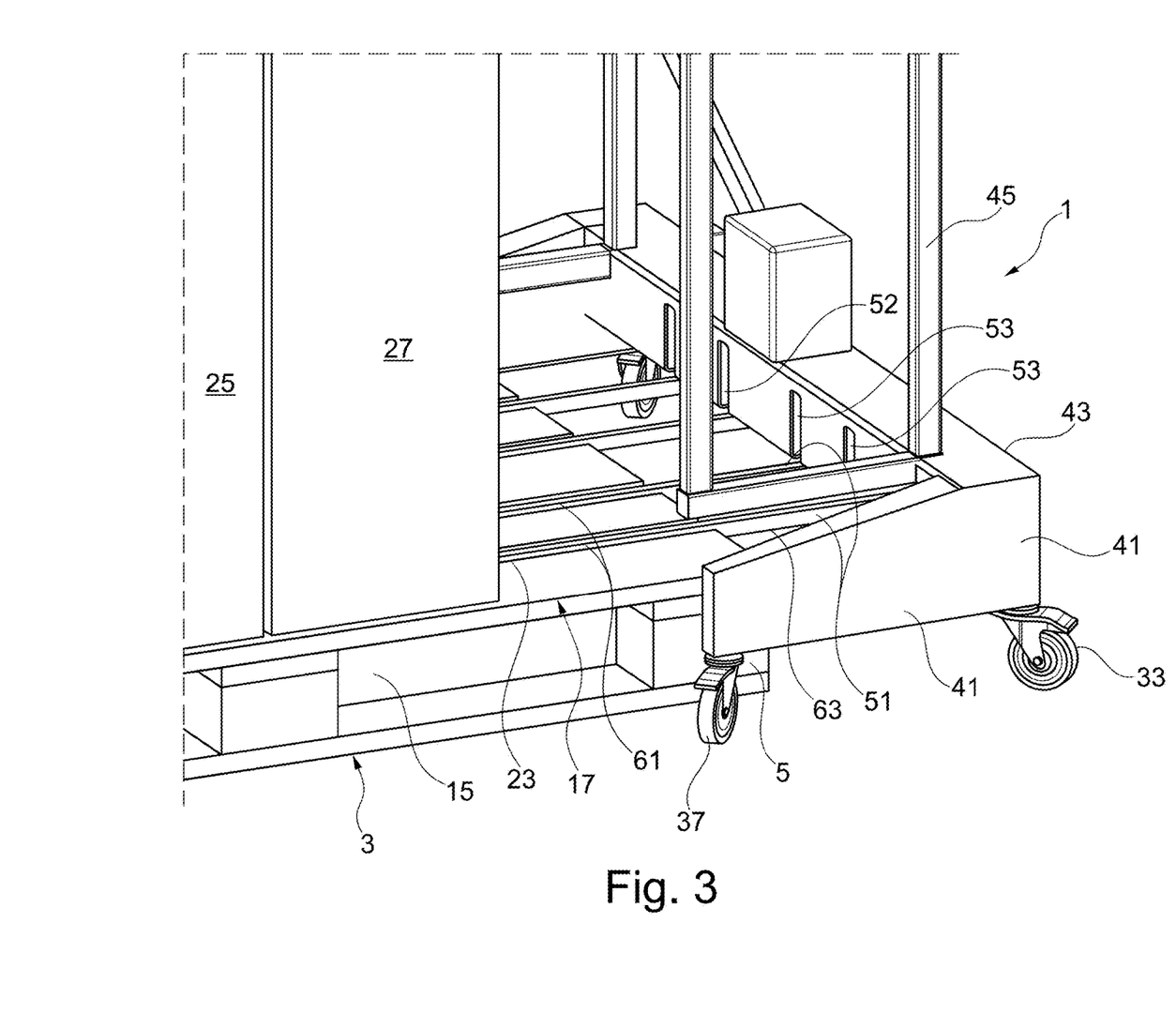
FIG. 3 shows a detailed view according to FIG. 2 where the transport good is deposited on the pallet and the lifting device for pallet goods has left the pallet.
Figure 4:
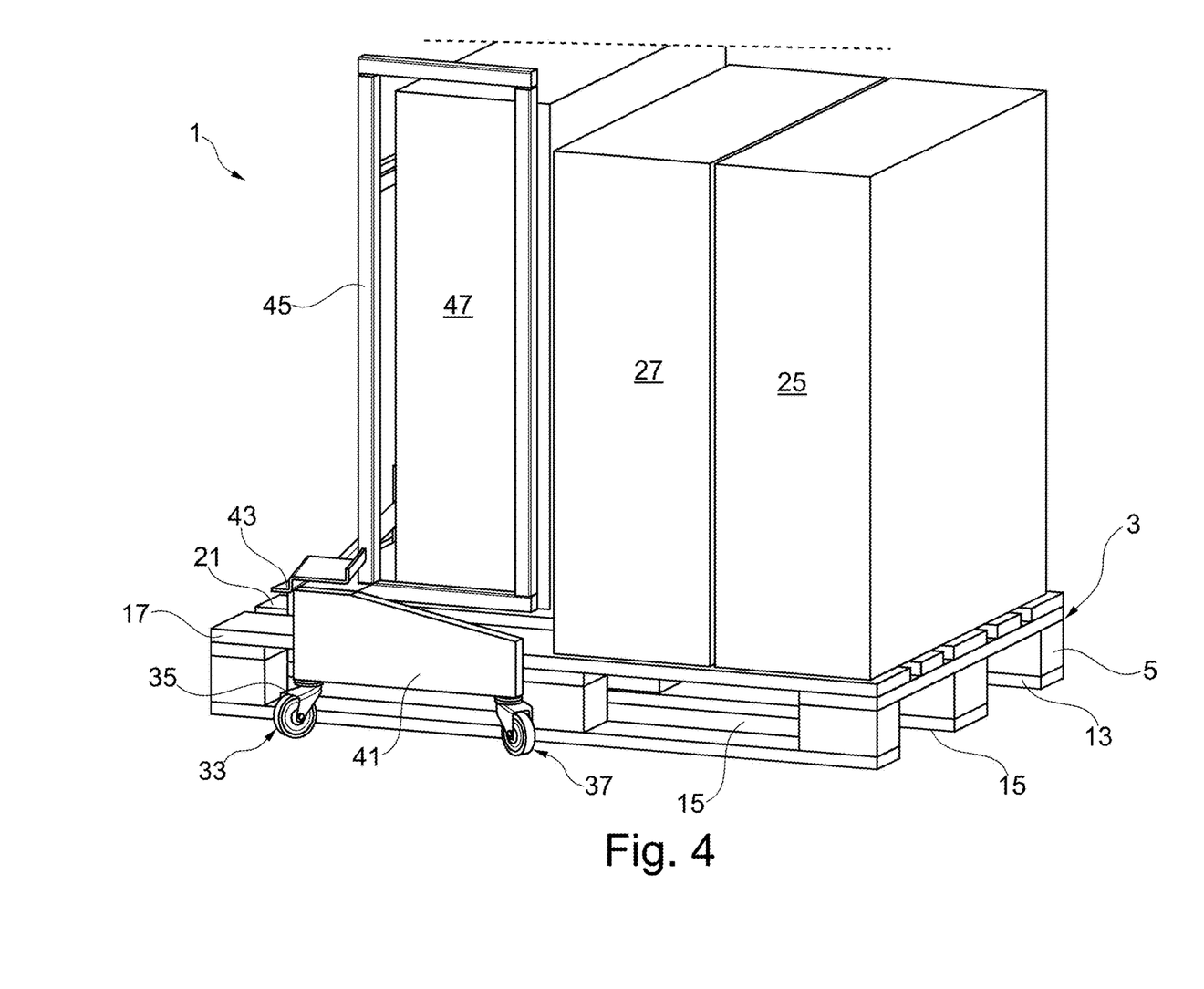
FIG. 4 shows a perspective back view of the lifting device for pallet goods according to the invention according to FIG. 1 where the lifting device for pallet goods has accessed the transport pallet without having deposited the pallet goods onto the transport pallet.

The lifting device for pallet goods 1 according to the invention comprises a chassis 31 with four lockable wheels 33 freely rotatable around a vertical bearing axis V in order to ensure that the lifting device for pallet goods can be randomly moved in the transverse direction Q and the longitudinal direction L. The wheels 33 can be configured as so called steering wheels, which are also known as castor wheels. The steering wheels are supporting wheel being not driven which independently align themselves with the direction of movement of the lifting device for pallet goods. The chassis has a rear wheel pair 34 and a front wheel pair 37 wherein the vertical bearing axes V of the front wheels 37 respectively the rear wheels 34 are spaced to each other in the transverse direction Q such that the chassis can laterally pass the longitudinal side (1200 mm), as it is shown in FIGS. 2 and 3.

The U-shaped chassis 31 as can be seen in the top view has two wheel supporting legs 41, 42 extending parallel with respect to each other and being oriented parallel to the longitudinal direction L for moving the lifting device for pallet goods over the standard pallet 3, as it is shown in FIGS. 1 to 4.

The wheel carrying leg 41 is attached to a crossbar 43 at which two lateral support frames 45 are attached which function as a pair for maintaining the paper stack stocks to be transported on the lifting device 1. Further function components of the lifting device are mounted on the crossbar 43.

The chassis 31 provides a vehicle function for the lifting device 1 which is moveable in all directions towards the standard pallet 3.

Figure 1:
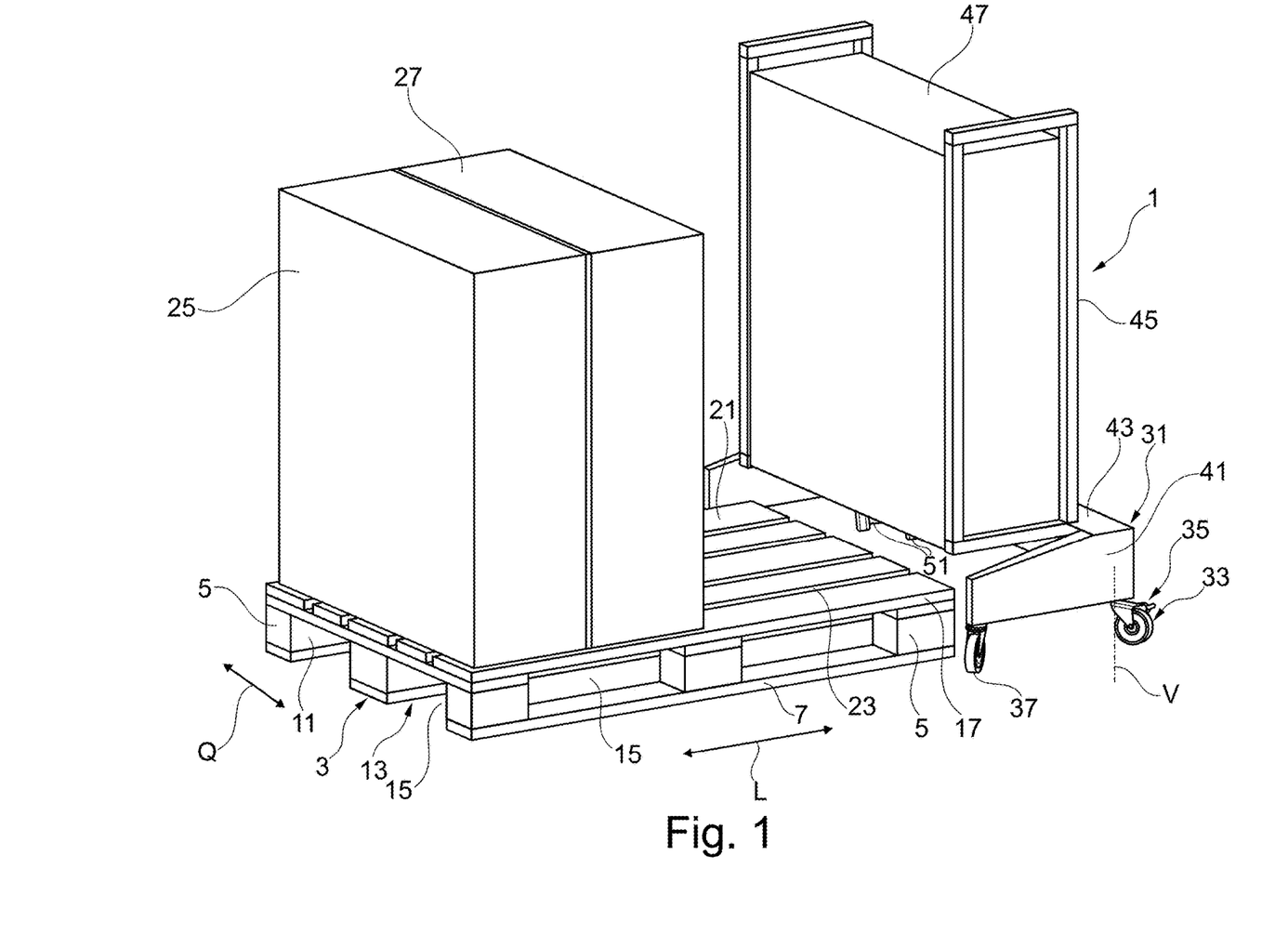
FIG. 1 shows a perspective view of a lifting device for pallet goods according to an exemplary embodiment which is loaded with a paper stack stock and is positioned in front of a standard pallet to deposit the paper stack stock next to two paper stack stocks already deposited.

An assembly of tines 51, which are identically dimensioned, is moveably mounted, namely shiftable in the height direction. The tines 51 extend perpendicular with regard to the crossbar 43 of the frame. The tines are rigidly connected with each other via a rod-shaped support base 52 which is moveable in the height direction in the inside of the crossbar 43. The tines extend parallel to each other and with regard to the longitudinal gaps 23, if the vehicle-shaped lifting device 1, as it is shown in FIGS. 1 to 3, is aligned with regard to the standard pallet 3 for loading and unloading. FIG. 1 shows a prepared depositing position of the lifting device 1 for pallet goods where both wheel-carrying legs 41, 42 are located in the front of the standard pallet 3 and each of them laterally besides an imaginary elongation of the longitudinal side of the rest 17 of the standard pallet 3 in order to be inserted and to move the tines 51 over the standard pallet 3, the tines 51 being aligned with the longitudinal gaps 23.

In order to move the tines 51 relative with regard to the chassis 31 in a height direction a lift drive not shown in detail is provided, which is actuated manually with a foot pedal 71. An activation device serves to preliminarily separate the tine assembly including the transport goods lying on it from the lift drive and to ensure a lowering under the influence of the weight. For slowing down the lowering motion, a damping device (not shown) is connected with the tine assembly.

In FIG. 1, the tines 51 are shown in a maximally lifted position so that the bottom side of the tines 51 is above the upper side of the rest 17 of the standard pallet 3.

As it is shown in FIG. 3, the tines 51 being parallel to each other are arranged in middle axis spacings in the transverse direction Q which correspond to the middle spacings of the longitudinal gaps 23 so that the tines 51 can access and leave the longitudinal gaps 23 contact-free in the longitudinal direction L upon a driving motion of the lifting device 1 without further actuating the paper web stacks 25, 27 with the tines 51. The lift drive 70 is merely configured to lift the tines 51 by a few centimeters, preferably up to 10 centimeters. The crossbar 43 has four height slits 53 through which the tines 51 extend.

The tines 51 have a tapering tip section 61 which fades into a middle section 63 which comprises a constant cross section in the longitudinal direction L. The width (in the transverse direction Q) of the tine 51 is smaller than 40 mm, preferably about 20 mm, wherein the tines are smaller than 20 mm in the height direction, preferably about 10 mm. In this way, it is ensured that the tines 51 can access the longitudinal gaps 23 of the standard pallet 3 without contacting the transport goods 25, 27.

In FIG. 2, the vehicle-shaped lifting device 1 has accessed the standard pallet wherein the tine assembly is lowered in order to deposit the paper web stack 47 onto the standard pallet 3. In this operating situation, the tines 51 are received in the longitudinal gaps 23 whereby the lifting device 1 is released from the paper web stack and wherein the tine assembly can be pulled away from the standard pallet 3, as it is shown in FIG. 3.

The vehicle-shaped lifting device 1 can be loaded with a paper web stack in order to load the last free space on the standard pallet 3.

As it is shown in FIG. 2, the lifting device 1 completely moves over the standard pallet 3 with its crossbar 43 because the chassis 31 with the crossbar 43 is mounted in a height position in which allows for substantially contact-free passing over the standard pallet 3. Preferably, the crossbar 43 lies more than 140 mm to 300 mm above the rolling surface (not shown) of the wheels 33.

Figure 5:
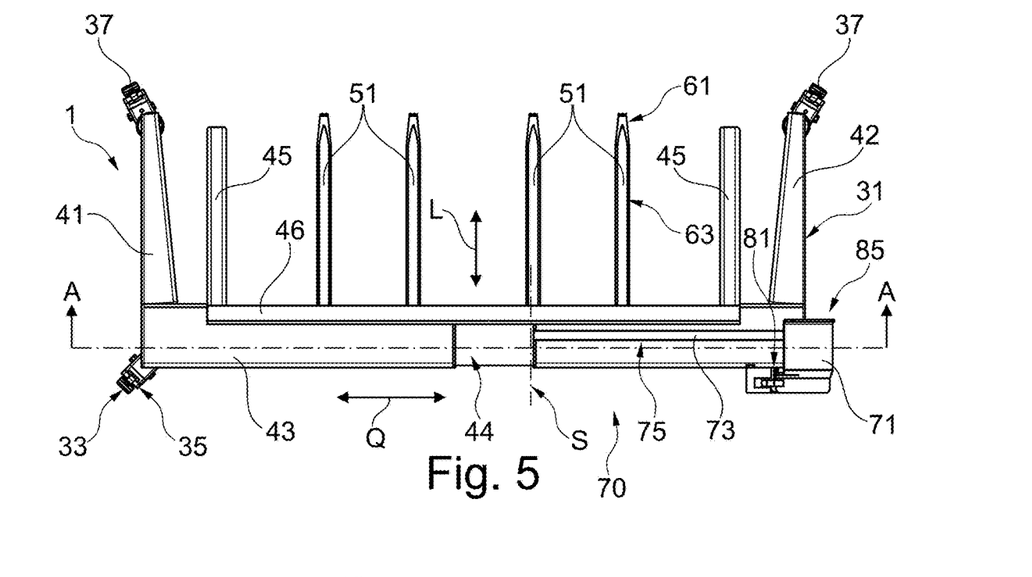
FIG. 5 shows a top view of a lifting device for pallet goods according to an exemplary embodiment.

In the top view shown in FIG. 5, the U-shape of the chassis 31, which is formed by the left and the right wheel carrying leg 41, 42 and the crossbar 43 can be seen, wherein the chassis 31 does not comprise a frame bar extending between the front wheel pair 37.

The tines 51 extend parallel between the wheel carrying legs 41, 42, starting from the crossbar 43, along the same distance in a longitudinal direction as the wheel carrying legs 41, 42.

Figure 6:
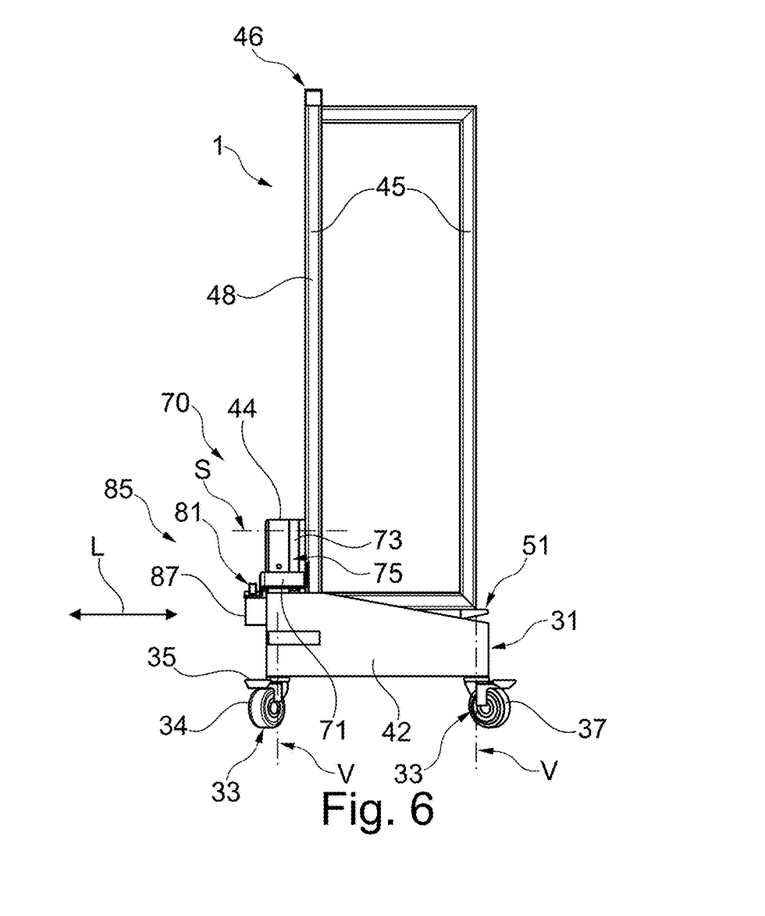
FIG. 6 shows a side view of a lifting device for pallet goods according to an exemplary embodiment.

FIG. 6 shows the lifting device with the tines 51 in their maximally lifted position, which is also shown in FIG. 1.

Analogously to FIG. 5, FIG. 6 also shows that the tines 51 terminate in the longitudinal direction L in approximately one plane with the wheel carrying leg 42. Thereby, it is ensured that the center of gravity of a paper web stack 47 lying completely on top of the tines 51 in a longitudinal direction is arranged essentially centered between the vertical bearing axes V of the wheels 33 such that a paper web stack is secured against falling down from the lifting device 1 in this way. Further, the locking levers 35 of the wheels 33 with which the wheels 33 can be locked in order to prevent an unintentional motion of the lifting device are shown in FIG. 6.

Figure 7:
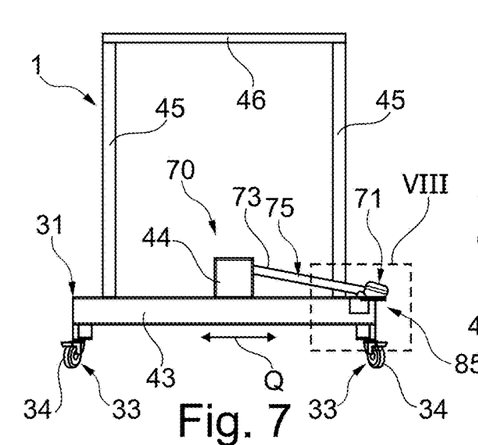
FIG. 7 shows a back view of a lifting device for pallet goods according to an exemplary embodiment.

FIG. 7 shows a back view of the lifting device 1 in which the crossbar 46 at the upper end of the support arms 45 is also shown which provides a stiffening of the support arms 45 against tilting in the cross direction. A crossbar 56 is attached in a vertical elongation to the upper end of the rear vertical bar 48 of the support frame 45 arranged above the crossbar 43. Further crossbars can be arranged at the back side of the vertical bar 48 distal the tines or in a longitudinal direction L in a plane with the crossbar 46 and the vertical bar 48 in order to secure a paper web stack 47 against falling out.

In the back view of the lifting device 1 according to FIG. 7, the lift drive 70 is shown which is partly housed in a transmission housing 44 at the crossbar 43. An actuation lever 75 of a rocker 73 of the lift drive 70 extends in the transverse direction Q out of the transmission housing 44, wherein the actuation lever 75 terminates into a foot pedal 71. FIG. 7 shows an active or actuated position of the rocker 73 in which the tines 51 are in its maximally lifted position, wherein the foot pedal 71 is fixed by a holding device 85.

Figure 8:
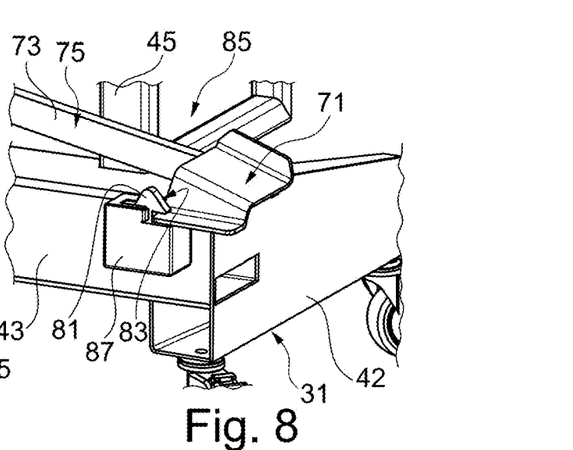
FIG. 8 shows a perspective detailed view of the lifting device for pallet goods according to FIG. 7.

The holding device 85 is shown in detail in FIG. 8 corresponding to the section VIII from FIG. 7. The holding device 85 comprises an engagement nose 81 moveably mounted on the chassis 31 and being able to snappingly cooperate with the foot pedal 71 of the rocker 73. The engagement nose 81 is moveably guided in an engagement nose reception 87 so that it can move between the holding position shown in FIG. 8 in which it fixes the rocker 73 in a releasing position (not shown) in which the engagement nose allows a movement of the rocker 73 with regard to the pivoting axis S. The engagement nose 81 has a sliding surface 83 which upon actuation of the rocker 73 is contacted by the foot pedal 71 whereby the engagement nose 81 is deflected against the force of a spring (not shown) within the engagement nose reception 87 such that the rocker 73 can be moved into its active position.

Figure 9:
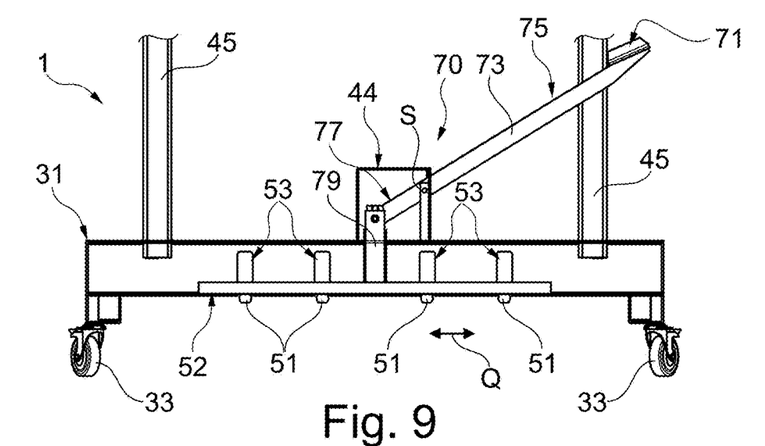
FIG. 9 shows a cross section of the lifting device for pallet goods according to the exemplary embodiment shown in FIG. 5 along the cross section line A-A, wherein the tine assembly is in a lower initial position.
Figure 10:
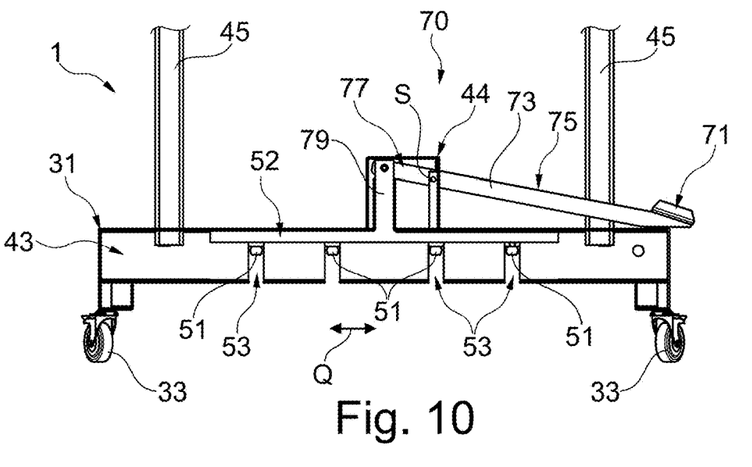
FIG. 10 shows a cross section of the lifting device for pallet goods according to the exemplary embodiment shown in FIG. 5 along a section line A-A, which shows the tine assembly in a maximally lifted position.

The active position of the rocker 73 of the lift drive 70 is also shown in FIG. 10 whereby FIG. 9 illustrates a passive or released position of the rocker 73 in which the tines 51 are provided in the lowering position which is also shown in FIG. 3 in which the tines 51 can be moved within the longitudinal gaps 23 of the standard pallet 3 without necessarily contacting the paper web stacks 25, 27 lying on the top of the standard pallet 3 by the tines 51.

It is shown in FIGS. 9 and 10 that the rocker 73 of the lift drive 70 is moveably mounted with regard on a pivoting axis S stationary arranged at the transmission housing 44 of the chassis 31. The load lever 77 of the rocker 73 is arranged within the transmission housing 44 wherein a connection rod 79 is steered via a further pivot bearing at the load lever 77 wherein the connection rod 79 is rigidly connected with a support base 52 of the tines 51, for example welded or screwed together.

By moving the rocker 73 of the lift drive 70 from the passive position according to FIG. 9 into the active position according to FIG. 10, for example due to an operator actuating the foot pedal 71, the tines 51 connected with the load lever 77 of the rocker 73 via the support base 52 and the connection rod 79 are lifted according to a force transmission.

Due to the fact that the length of the actuation lever 75 between the pivoting axis S and the foot pedal 71 is about four times as long as the length of the load lever 77 between the pivoting axis S and the steering point of the rocker 73, the actuation force applied by an operator is transformed into a force being four times bigger for lifting the paper web stack.

A tilting of the paper web stack on the tines 51 with regard to the steering point of the connection rod 79 is prevented in that the connection rod 79 is attached to the support base 52 in essentially the middle between the tines 51 and in that the tines 51 are vertically guided in the height slits 53.

The features disclosed in the preceding description, the figures and the claims can be relevant for the realization of the invention in its various embodiments alone as well as in any combination.

REFERENCE NUMERALS 1 lifting device for pallet goods
3 standard pallet
5 columns
7 longitudinal bottom boards
11 transverse intermediate boards
13 support structure
15 access clearances
17 upper side of the rest
21 support boards
23 longitudinal gaps
25, 27, 47 paper web stack
31 chassis
33 wheels
34 rear wheel pair
35 locking lever
37 front wheel pair
41, 42 wheel carrying leg
43 crossbar
44 transmission housing
45 support frame
46 crossbar
48 vertical bar
51 tines
52 support base
53 height slits
61 tip section
63 middle section
70 lift drive
71 foot pedal
73 rocker
758 actuation lever
77 load lever
79 connection rod
8i engagement nose
83 sliding surface
85 holding device
87 engagement nose reception
A-A cross section
L longitudinal direction
Q transverse direction
S pivoting axis
V vertical bearing axis

The invention claimed is:

1. A lifting device for loading and unloading of transport or pallet goods onto and from a transport pallet, the pallet including a support structure forming lateral access clearances and a rest forming an upper side on which the respective transport or pallet goods is to be deposited and which includes a plurality of longitudinal panels spaced apart from each other by forming at least two longitudinal gaps arranged parallel to each other, wherein the at least two longitudinal gaps are open to the upper side of the pallet, the lifting device comprising:
   a support frame;
   a tine assembly that is liftably mounted on the support frame and includes at least two tines extending parallel to each other and in a longitudinal direction, the at least two tines being configured to receive and lift the transport or pallet goods from the transport pallet or to deposit the transport or pallet goods on the transport pallet; and
   a chassis having laterally extending legs that are rigidly connected to each other via a crossbar, and at least two wheels arranged at respective legs of the laterally extending legs, the at least two wheels including a left side wheel and a right side wheel, the laterally extending legs and the at least two wheels being spaced apart from each other at a distance perpendicular to the longitudinal direction, the laterally extending legs and the at least two wheels being configured to pass parallel to longitudinal sides of the pallet that extend in the longitudinal direction upon a rolling motion of the chassis in the longitudinal direction while the at least two tines are engaged with the at least two longitudinal gaps and at least part of the pallet is located between the left side wheel and right side wheel,
   wherein the crossbar is configured to pass over the upper side of the pallet upon the rolling motion of the chassis in the longitudinal direction while the pallet is located between the left side wheel and right side wheel, and
   wherein a tine spacing of the at least two tines is configured to a gap spacing of the at least two longitudinal gaps, and the at least two tines are configured to be form-fitted with regard to the at least two longitudinal gaps such that they can access the at least two longitudinal gaps in the longitudinal direction.

2. The lifting device for loading and unloading of transport or pallet goods according to claim 1, wherein a height dimension for the at least two tines, particularly at their transport goods carrying section, is at most 25 mm.

3. The lifting device for loading and unloading of transport or pallet goods according to claim 2, wherein the at least two tines comprise four tines, two outer tines and two middle tines, a distance in a transverse direction of each of the two outer tines of the four tines and a respective adjacent one of the two middle tines of the four tines is about 100 mm to 120 mm, and wherein a middle distance in the transverse direction between the two middle tines of the four tines is 140 mm to 160 mm.

4. The lifting device for loading and unloading of transport or pallet goods according to claim 1, wherein the at least two tines comprises four tines, two outer tines and two middle tines, a distance in a transverse direction of each of the two outer tines of the four tines and a respective adjacent one of the two middle tines of the four tines is about 100 mm to 120 mm, and wherein a middle distance in the transverse direction between the two middle tines of the four tines is 140 mm to 160 mm.

5. The lifting device for loading and unloading of transport or pallet goods according to claim 1, wherein the at least two tines are movably provided at a mobile frame in a height direction by an elevation device mounted on the mobile frame and being particularly configured to linearly lift the transport goods at most 10 mm to 20 mm, and wherein the elevation device further comprises:
   a transmission that is configured to be manually operable by an operator, and
   a lowering device, which upon actuation, is configured to lower the tine assembly under an influence of a weight of the tine assembly damped into a transport goods transferring position.

6. The lifting device for loading and unloading of transport or pallet goods according to claim 5, wherein the mobile frame is U-shaped or H-shaped in a top view.

7. The lifting device for loading and unloading of transport or pallet goods according to claim 5, wherein lateral supports for the transport goods are unadjustably attached to the mobile frame, the lateral supports having a frame structure positioned such that a lower longitudinal bar is located at a height at which the at least two tines are maximally liftable.

8. The lifting device for loading and unloading of transport or pallet goods according to claim 1, wherein the at least two wheels of the chassis have a front pair of wheels and a rear pair of wheels according to the longitudinal direction, wherein a distance in a transverse direction is at least 800 mm and at most 1000 mm.

9. The lifting device for loading and unloading of transport or pallet goods according to claim 1, wherein the tine assembly comprises:
   a carrier base that is movably mounted on the support frame of the lifting device or that extends substantially in a transverse direction perpendicular to the at least two tines,
   wherein the at least two tines are adjustably and fixably provided at the carrier base in the transverse direction and adaptable to a different longitudinal gap spacing, and
   wherein the carrier base comprises predetermined position detents for the at least two tines, locations of the position detents corresponding to a position of longitudinal gaps of different transport pallets.

10. The lifting device for loading and unloading of transport or pallet goods according to claim 9, wherein:
    the carrier base is rod-shaped, and
    the at least two tines are attached to a lower side of the rod-shaped carrier base.

11. The lifting device for loading and unloading of transport or pallet goods according to claim 9, wherein the carrier base is linearly movably mounted in a height direction in a cavity of the crossbar of the chassis.

12. A modular system comprising the lifting device of claim 1, wherein the tine assembly or the at least two tines are changeable provided at the lifting device and are selectable for a predetermined transport pallet based on an application from a set of tine assemblies or the at least two tines to be mounted to the lifting device for transport or pallet goods according to an operation.

13. The lifting device for loading and unloading of transport or pallet goods according to claim 1, wherein the chassis further comprises at least one additional wheel that is spaced apart from the at least two wheels in the longitudinal direction, wherein the at least one additional wheel is configured to pass parallel to the longitudinal sides of the pallet that extend in the longitudinal direction upon the rolling motion of the chassis in the longitudinal direction.

14. The lifting device for loading and unloading of transport or pallet goods according to claim 1, wherein the chassis further comprises two additional wheels that are spaced apart from the at least two wheels in the longitudinal direction, wherein the two additional wheels are configured to pass parallel to the longitudinal sides of the pallet that extend in the longitudinal direction upon the rolling motion of the chassis in the longitudinal direction.

15. The lifting device for loading and unloading of transport or pallet goods according to claim 14, wherein each of the legs include one of the at least two wheels and one of the additional wheels coupled thereto.

16. The lifting device for loading and unloading of transport or pallet goods according to claim 1, wherein:
the tine assembly is mounted on the support frame via the crossbar of the chassis; and
the crossbar includes height slits in which the at least two tines extend, the height slits configured to guide the at least two tines during movement of the at least two tines.

17. The lifting device for loading and unloading of transport or pallet goods according to claim 1, wherein the crossbar is configured to completely pass over the upper side of the pallet when the lifting device engages a first end of the pallet and disengages from a second end of the pallet opposite the first end.

18. A lifting system comprising:
a transport pallet configured to support transport or pallet goods, the transport pallet including a support structure forming lateral access clearances and a rest forming an upper side configured to support the transport or pallet goods deposited thereon, the rest having at least two longitudinal gaps arranged parallel to each other and formed by longitudinal panels of the rest that are spaced apart from each other, wherein the at least two longitudinal gaps are open to the upper side of the transport pallet; and
a lifting device configured to load and unload the transport or pallet goods onto and from the transport pallet, the lifting device including:
a support frame;
a tine assembly that is liftably mounted on the support frame and includes at least two tines extending parallel to each other and in a longitudinal direction, the at least two tines being configured to receive and lift the transport or pallet goods from the transport pallet or to deposit the transport or pallet goods on the transport pallet, wherein a tine spacing of the at least two tines is configured to a gap spacing of the at least two longitudinal gaps, and the at least two tines are form-fitted to the at least two longitudinal gaps such that the at least two tines can access the at least two longitudinal gaps in the longitudinal direction; and
a chassis having laterally extending legs that are rigidly connected to each other via a crossbar, and at least two wheels arranged at respective legs of the laterally extending legs, the at least two wheels including a left side while and a right side wheel, the laterally extending legs and the at least two wheels being spaced apart from each other at a distance perpendicular to the longitudinal direction, the laterally extening legs and the at least two wheels being configured to pass parallel to longitudinal sides of the transport pallet that extend in the longitudinal direction upon a rolling motion of the chassis in the longitudinal direction while the at least two tines are engaged with the at least two longitudinal gaps and at least part of the transport pallet is located between the left side wheel and right side wheel,
wherein the crossbar is configured to pass over the upper side of the pallet upon the rolling motion of the chassis in the longitudinal direction while the pallet is located between the left side wheel and right side wheel.

19. A lifting device for loading and unloading of transport or pallet goods onto and from a transport pallet, the pallet including a support structure forming lateral access clearances and a rest forming an upper side on which the respective transport or pallet goods is to be deposited and which includes a plurality of longitudinal panels spaced apart from each other by forming at least two longitudinal gaps arranged parallel to each other and extending in a longitudinal direction, wherein the at least two longitudinal gaps are open to the upper side of the pallet, the lifting device comprising:
a support frame including a plurality of side portions spaced apart from each other in a lateral direction perpendicular to the longitudinal direction, the side portions being connected to each other by a frame crossbar that extends in the lateral direction to form a cavity between the plurality of side portions;
a tine assembly that is liftably mounted to the support frame and includes at least two tines extending parallel to each other and in the longitudinal direction, the at least two tines being configured to receive and lift the transport or pallet goods from the transport pallet or to deposit the transport or pallet goods on the transport pallet, wherein the support frame is configured to receive and support, in the cavity formed between the plurality of side portions, the transport or pallet goods disposed on the at least two tines; and
a chassis having laterally extending legs that are rigidly connected to each other via a crossbar, and at least two wheels arranged at respective legs of the laterally extending legs, the at least two wheels including a left side wheel and a right side wheel, the laterally extending legs and the at least two wheels being spaced apart from each other at a distance in the lateral direction, the laterally extening legs and the at least two wheels being configured to pass parallel to longitudinal sides of the pallet that extend in the longitudinal direction upon a rolling motion of the chassis in the longitudinal direction while the at least two tines are engaged with the at least two longitudinal gaps and at least part of the pallet is located between the left side wheel and right side wheel,
wherein the crossbar is configured to pass over the upper side of the pallet upon the rolling motion of the chassis in the longitudinal direction while the pallet is located between the left side wheel and right side wheel, and
wherein a tine spacing of the at least two tines is configured to a gap spacing of the at least two longitudinal gaps, and the at least two tines are configured to be form-fitted with regard to the at least two longitudinal gaps such that they can access the at least two longitudinal gaps in the longitudinal direction.

20. The lifting device for loading and unloading of transport or pallet goods according to claim 19, wherein the plurality of side portions of the support frame extend in the longitudinal direction and parallel to the at least two tines from the frame crossbar to the at least two wheels.

21. The lifting device for loading and unloading of transport or pallet goods according to claim 20, wherein the at least two tines are disposed between the plurality of side portions of the support frame in the lateral direction, and the plurality of side portions are disposed between the at least two wheels in the lateral direction such that the at least two wheel are completely outside of the plurality of side portions of the support frame in the lateral direction.

22. The lifting device for loading and unloading of transport or pallet goods according to claim 21, wherein the at least two wheels are arranged at respective laterally extending legs of the chassis, the laterally extending legs extending in the longitudinal direction and parallel to the plurality of side portions, and wherein the plurality of side portions are between the laterally extending legs in the lateral direction.

\* \* \* \* \*